Oct. 9, 1928.
C. H. CRONE
1,686,845
COMBINED CENTERING, BABBITTING, AND MACHINING DEVICE
Filed Sept. 30, 1924
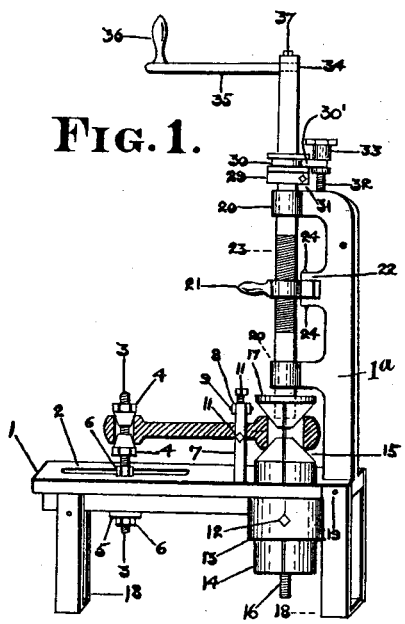
FIG. 1.
FIG. 4.
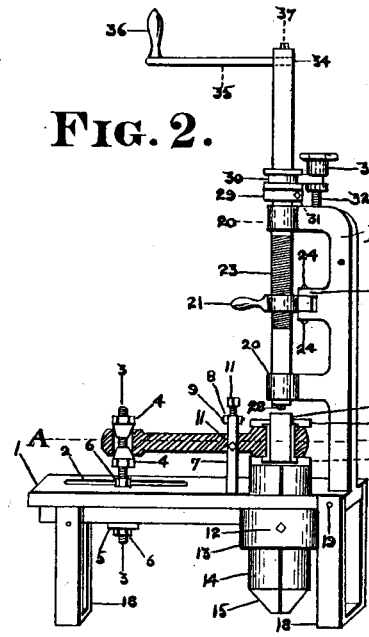
FIG. 2.
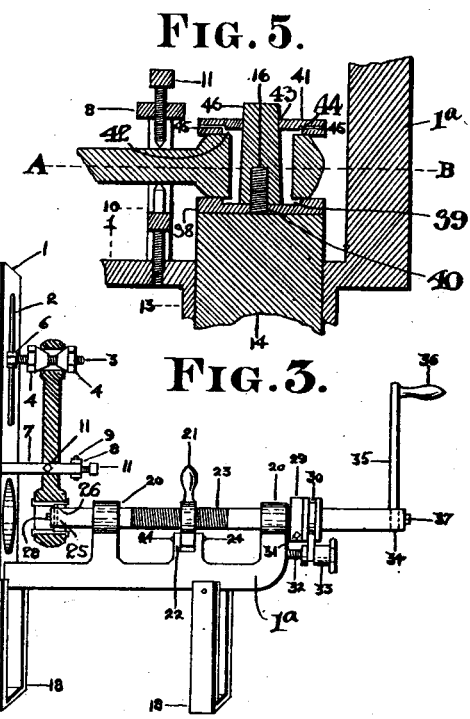
FIG. 5.
FIG. 3.
WITNESSES.
Eleanor Crone
James Edwin Murray
INVENTOR.
Charles Hall Crone.
By [signature]
ATTORNEY.

Patented Oct. 9, 1928.

1,686,845

UNITED STATES PATENT OFFICE.

CHARLES HALL CRONE, OF TITUSVILLE, PENNSYLVANIA.

COMBINED CENTERING, BABBITTING, AND MACHINING DEVICE.

Application filed September 30, 1924. Serial No. 740,763.

My invention relates to that class of combination machines which are used exclusively in the lines of trade and manufacture where technical accuracy is required in the three operations of centering, babbitting and machining, of connecting rods of the various sizes and dimensions, so extensively used in the automobile and motor vehicles industries.

An object of my invention is to provide a quick acting portable machine, preferably operated by hand, combining the three operations in one machine, which is adjustable to the various sizes and dimensions of connecting rods in use.

Another object of my invention is the provision of a machine of compact and small size, of simple, durable and inexpensive construction and which will perform its several functions in a rapid and efficient manner, all combining to provide an efficient and practical machine.

Further objects and advantages will appear in the following description, it being understood that various changes in form, proportions and minor details of construction may be resorted to within the scope of the appended claims, including motor drive if it proves applicable.

In my improved combination centering, babbitting and machining device I accomplish the objects set forth by using in combination a metal frame having two arms at right angles, molded in one piece, of special shape and form, to which are fitted attachments and parts, removable, interchangeable and reversible as needed; certain attachments being machined in assorted sizes to meet the requirements of the trade. One arm of the metal frame is of special shape and design, having the top surface machined, forming a plate or table, on which the centering and babbitting operations are completed. The second arm of the metal frame is of special shape and design forming a bracketed support for the threaded boring bar and special feed attachments required in the machining operations of boring and facing of the babbitted crank pin bearing of the connecting rods.

In the drawings hereto attached and made part hereof:

Figure 1 is a side view showing the general appearance of the entire machine, with the several parts assembled in position for the centering operation, showing a cross section, in outline, of a connecting rod clamped in position.

Fig. 2 is a side view showing the several attachments reversed, interchanged, and assembled in position for the babbitting operation, showing in outline a cross section of the connecting rod with parts fitted to crank pin bearing forming mold for Babbitt metal.

Fig. 3 is a side view showing the machining device in horizontal position, the molding attachments removed, and the boring operation partly finished.

Figure 4 is a view of the several parts and attachments of my invention required to complete the three operations capable of performance with the device.

Figure 5 is a vertical sectional detail view showing the device used for molding babbit bearings in a connecting rod, as at line A—B of Figure 2.

In carrying out my invention I use an angular frame made up of a pair of rigid arms 1 and 1ª, the former in the nature of a plate or table having a longitudinally extending central slot 2 therein and adapted to support the work, as a connecting rod, while centering, babbitting or machining its bearings. For this purpose a threaded pin 3 is fitted in the longitudinal slot and equipped with beveled or cone-shaped nuts 4 by means of which the piston-bearing end of the connecting rod is adjusted and supported in correct position. A washer 5 and clamp nuts 6 are used on the pin and bear against the arm 1 for retaining the threaded pin 3 in adjusted position.

The body of the connecting rod as shown is supported by means of a four-way clamp which is secured to the arm 1 and comprises a U-shape frame having two posts 7 connected by a cross bar 8, and pins 9 are employed to secure the forked ends of the cross bar to the posts. The cross bar may be removed to permit placing of the connecting rod in position for work, after which the cross bar is replaced and secured to the yoke. The rod is centered and held in adjusted position by means of a centering screw 10 in the yoke of the frame and three bolts 11, all of which are arranged in alined pairs and have their pointed ends in position to engage the rod.

At the larger or crank shaft bearing end of the connecting rod additional means for supporting the rod are provided in connection with the arm or table 1, which means include devices, as a set bolt 12 which is threaded through the wall of a cylindrical bushing 13 preferably formed integral with the arm 1 of the angular frame and with its longitudinal axis at right angles to the plane of the table or arm 1. The body of the bushing projects from the table while the working face of the table forms the flush edge of the bushing, and within the bushing an adjustable, reversible, centering tool 14 is adapted to seat and be retained in position by means of the set bolt 12. The reversible tool is fashioned with a beveled or conical head 15, which as indicated in Figure 1 is used to center and support at one side the crank-bearing of the connecting rod while it is retained in position by means of the screw bar 3 and supporting frame 7.

This tool 14 is also fashioned with a threaded spindle 16 to be used when the tool is reversed as to position and used in connection with the molding device for bearings, as will be described.

In connection with the tool 14 and its head 15 a complementary tool head 17 is used for the bearing of the connecting rod, which latter head fits on the end of a boring bar 23.

When used as in Figure 1 the angular frame is supported as from a bench, with the table 1 in horizontal position, by means of a pair of interchangeable U-shaped legs or yokes 18, which may be rigidly attached to the bench if desired, and are detachably secured, as by pins 19 to the selected arm of the angular frame, depending upon the position of the frame.

The boring bar is supported in bearings 20 of the frame arm 1$^a$ and this bar is threaded intermediate its bearings to accommodate a screw feed device comprising an openable, sectional, non-travelling nut 21 having handle portions for clamping it on the threaded bar, and pivoted at bearing 22 on the frame arm 1$^a$ by means of the pivot pin 24. By turning the crank arm 35 and handle 36 of the boring bar, and clamping the sectional feed-screw nut 21 on the threaded part of the bar it will be apparent that the latter may be fed as desired and guided in its bearings 20.

In Figure 3 the machine is adapted for boring a bearing in a connecting rod. At its end the boring bar is provided with a transverse socket or slot 25 to receive the round nose boring tool 26, and the set bolt or screw 28 threaded into the end of the boring bar is employed to clamp the tool in position for work.

When machining the bossed parts of babbitted crank pin bearings of the connecting rod, a special feed attachment is desirable for use in connection with the boring bar 23. This special feed attachment is fixed to the bar and co-acts with the frame arm 1$^a$ as indicated in Figures 1, 2 and 3. The special feed attachment comprises a slotted clutch sleeve 29 on the boring bar and is grooved to receive the yoke 30, the sleeve being clamped in position on the bar by means of a set screw 31. A threaded feed spindle 32 is located in the fork 30′ of the yoke 30 and the end of this spindle bears against the arm 1$^a$ of the angular frame. By means of the cylindrical head 33 of the screw the latter may be turned in its forked bearing-yoke 30 for adjusting the boring bar relatively to its supporting arm 1$^a$.

The handle bar or crank arm 35 of the boring bar is detachably fitted to the boring bar in a transverse socket or slot 34 of the latter and the parts are secured by means of a set screw 37.

When molding Babbitt metal bearings the position of the tool 14 with relation to its cylindrical support 13 is reversed from the position of Figure 1 to that of Figure 2, and the spindle 16 and tool 14 are used to support the mold as in Figure 5. The mold comprises a metal disk 38 which is recessed at 39 to form the bottom matrix of the mold and the disk has a hole 40 therein to slip over the spindle 16 of the tool 14. The bearing part of the rod is supported on this disk and the rod is retained as indicated in Figure 5 on the tool 14. An upper disk 41 complementary to the lower disk, is placed upon the top face of the bearing portion of the rod and this disk is recessed as at 42 to form the upper matrix of the mold. A centrally located opening 43 of the upper disk permits the latter to be slipped over the upper end of a tapered core-mandrel 46 which is threaded on the spindle 16 to complete the mold.

The molten metal is introduced to the bearing through the sprue hole 44 of the mold and radial openings or risers 45 in the upper disk are provided for escape of gas and excess metal during the pouring operation.

Various sizes of mandrels 46 and matrix disks 38 and 41 are illustrated for use in molding different sizes of bearing sleeves.

It will be apparent that the angular frame may with facility be positioned as indicated in the drawings for the various operations and the interchangeable legs coupled in pairs to the selected arm of the frame.

I consider one of the most important features of my invention resides in the right angle shape of the main member of my device in connection with the supporting legs of different widths to adapt them to fit the broad flat portion and the narrow portion of said right angle shape member, as this permits my device to be adjusted for all of the various operations of centering, babbitting and machining and produces a device capable of production at a very small cost all things considered.

Having thus fully described my invention, what I claim as new and desire to secure by Letters Patent is:

A centering, babbitting and boring machine for connecting rods, comprising a work table, adjustable means carried by said table for supporting a connecting rod adjacent the ends thereof, a tool axially adjustable and reversibly mounted in a guide in said table adjacent one of said supporting means, said tool having a conical bearing centering projection at one end and means at the opposite end for detachably securing a babbitting mold, an arm carried by said table having spaced bearings aligned with the axis of said reversible tool, a threaded tool spindle adjustably mounted in said bearings, and a split nut pivotally connected with said arm between said bearings and adapted to engage the threads of said tool spindle.

In testimony whereof I hereunto affix my signature.

CHARLES HALL CRONE.